United States Patent [19]

Faroudja

[11] Patent Number: 5,014,119
[45] Date of Patent: May 7, 1991

[54] HORIZONTAL AND VERTICAL TRANSITION LEVEL ENHANCEMENT WITHIN TELEVISION SYSTEM

[76] Inventor: Yves C. Faroudja, 26595 Anacapa Dr., Los Altos Hills, Calif. 94022

[21] Appl. No.: 398,786

[22] Filed: Aug. 25, 1989

[51] Int. Cl.$^5$ ............................................. H04N 9/64
[52] U.S. Cl. ...................................... 358/37; 358/166
[58] Field of Search .................................. 358/37, 166

[56] References Cited

U.S. PATENT DOCUMENTS

| | | | |
|---|---|---|---|
| 4,030,121 | 6/1977 | Faroudja | 358/37 |
| 4,262,304 | 4/1981 | Faroudja | 358/166 |
| 4,263,616 | 4/1981 | Lee | 358/166 |
| 4,459,613 | 7/1984 | Faroudja | 358/37 |
| 4,623,913 | 11/1986 | Fling et al. | 358/11 |
| 4,639,763 | 1/1987 | Willis et al. | 358/37 |
| 4,663,653 | 5/1987 | Patel | 358/37 |

*Primary Examiner*—John W. Shepperd
*Attorney, Agent, or Firm*—David B. Harrison

[57] ABSTRACT

A television signal processing system includes a source of video images for providing luminance and chrominance components of the video images by generating and putting out scan lines. The source includes a low level horizontal domain detail processor connected for boosting low level horizontal transitions of the luminance component put out by the source below a predetermined threshold level. The system typically includes a signal-degrading path such as one characteristic of transmission or recording. The signal is passed through the degrading path to a display unit. A line doubler is preferably, although not necessarily, included in the display unit for doubling the number of decoded scan lines of the signal and for putting out scan line doubled luminance and chrominance components. A display image processor is connected to the line doubler and provides horizontal domain transition high level enhancement for enhancing horizontal domain transitions having amplitudes above the predetermined threshold level. The display image processor further preferably includes vertical enhancement for enhancing vertical domain transitions in accordance with predetermined vertical domain enhancement criteria, such as low level vertical detail boost and vertical contouring.

5 Claims, 5 Drawing Sheets

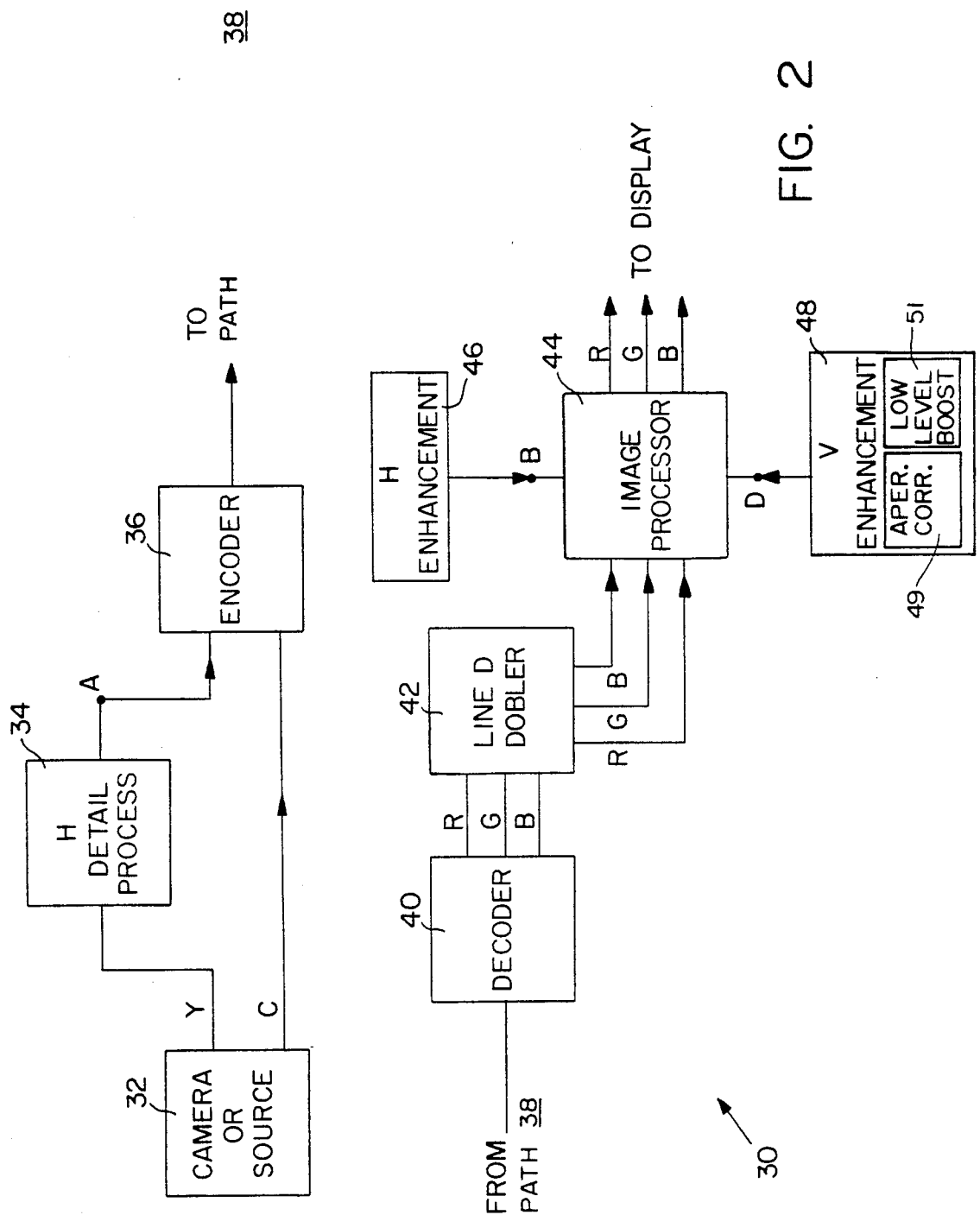

SMALL TRANSITION    LARGE TRANSITION

SMALL TRANSITION    LARGE TRANSITION

SMALL TR.  LARGE TR.  INTERLACE DISPLAY

SMALL TR.  LARGE TR.

he HORIZONTAL AND VERTICAL TRANSITION LEVEL ENHANCEMENT WITHIN TELEVISION SYSTEM

FIELD OF THE INVENTION

The present invention relates to apparatus and methods for television signal processing. More particularly, the present invention relates to methods and apparatus for providing horizontal and vertical transition level enhancement to a television video image display within a system including a video source, a degrading path such as transmission or recording, and a display, so as to increase virtual resolution at the display.

BACKGROUND OF THE INVENTION

It is conventional to provide both horizontal and vertical enhancement processes within a television system at the source. Typically, the signal is then encoded in a conventional signal format such as NTSC, PAL or Secam, RF modulated and transmitted (or recorded on magnetic tape), RF demodulated, decoded and displayed on a television display screen. Sometimes horizontal peaking is used at the display device.

This prior approach is illustrated in FIG. 1, labelled "Prior Art". Therein, a conventional television image system 10 includes a camera or other source 12 of video image information. A horizontal enhancement process 14 and a vertical enhancement process 16 cooperate with the source 12 to provide signal enhancement in the horizontal and vertical domains. An encoder 18 functions to encode chrominance and luminance components of the video image signal put out by the source 12 into signals following a predetermined signal format, such as NTSC, for example.

The output from the encoder 18 is then RF modulated and transmitted over a signal degrading medium, generalized by the block 20 of FIG. 1. Alternatively, the degrading path or medium may comprise playback of a video magnetic tape recording.

Following reception of the transmitted signal (or playback in the case of a video recording), the signal is decoded in a decoder 22 which functions to decode the format encoded by the encoder 18 (e.g. NTSC). A horizontal peaking process 24 may be included at the decoder 22. The decoder 22 typically puts out red, green and blue signals to a display device 26, such as a cathode ray tube, for example. This approach has been very useful for many years and has given the viewing public a very acceptable video image display quality.

However, this prior approach is no longer adequate for the developing needs of advanced television image systems, given the single channel limitations of transmission bandwidth (about 6 MHz in the NTSC signal format). Presently, it is most desirable to provide a picture resolution quality which is about twice that achieved by the conventional display devices (525 interlaced scan lines in the NTSC format). Such doubled virtual picture resolution is achievable by use of line doubling techniques, in combination with multiplicative horizontal transition enhancement techniques. Such techniques are described in the inventor's earlier U.S. Pat. No. 4,030,121 entitled "Video Crispener".

A hitherto unsolved need has therefore arisen for a reconfiguration of image enhancement processes within television systems including line doubling techniques for doubled virtual picture image resolution.

SUMMARY OF THE INVENTION WITH OBJECTS

A general object of the present invention is to provide horizontal and vertical transition level enhancement to a television video image display within a system including a video source, a degrading path such as transmission or recording, and a display, for increased virtual resolution at the display, in a manner which overcomes limitations and drawbacks of the prior art.

A more specific object of the present invention is to provide low level horizontal transition boost at a video source and to provide high level horizontal transition enhancement at a display, wherein the display is separated from the source by a degrading medium, such as a broadcast path or a recording path.

Yet another specific object of the present invention is to provide vertical transition enhancement processes following a line doubling process within a display thereby to increase virtual vertical resolution.

A television signal processing system in accordance with the present invention preferably includes a source of video images for providing luminance and chrominance components of the video images by generating and putting out scan lines. The source includes a low level horizontal domain detail processor connected for boosting low level horizontal transitions of the luminance component put out by the source below a predetermined threshold level. An encoder is connected to encode the chrominance component and the detail boosted luminance component into an encoded signal in accordance with a predetermined signal format, such as NTSC or PAL. The system typically includes a signal-degrading path such as one characteristic of transmission or recording. The encoded signal is passed through the degrading path to a display unit. The display unit includes a decoder which is connected to receive the encoded signal passed through the degrading path and to decode the signal in accordance with the predetermined signal format to produce luminance and chrominance components. A line doubler is preferably, although not necessarily, connected to the decoder for doubling the number of decoded scan lines of the signal and for putting out scan line doubled luminance and chrominance components. A display image processor is connected to the line doubler and provides horizontal domain transition high level enhancement for enhancing horizontal domain transitions having amplitudes above the predetermined threshold level. The display image processor further preferably includes vertical enhancement for enhancing vertical domain transitions in accordance with predetermined vertical domain enhancement criteria, such as low level vertical detail boost and vertical contouring.

These and other objects, aspects, advantages and features of the present invention will be more fully understood and appreciated by considering the following detailed description of a preferred embodiment, presented in conjunction with the accompanying drawings.

BRIEF DESCRIPTION OF THE DRAWINGS

In the Drawings:

FIG. 2 is a block diagram of a television system incorporating the principles of the present invention.

DETAILED DESCRIPTION OF A PREFERRED EMBODIMENT

In accordance with the principles of the present invention, a television system 30, FIG. 2, includes a camera or other source 32 of television picture images. This source 32 puts out separately a luminance component on a line Y, and a chrominance component on a line C. The luminance line Y leads directly to a horizontal domain detail processor 34. The detail processor 34 may be preferably in accordance with the present inventor's prior U.S. Pat. No. 4,262,304 and most preferably in accordance with the present inventor's prior U.S. Pat. No. 4,847,681, the disclosures of both said patents being specifically incorporated herein by reference.

Figure 1:
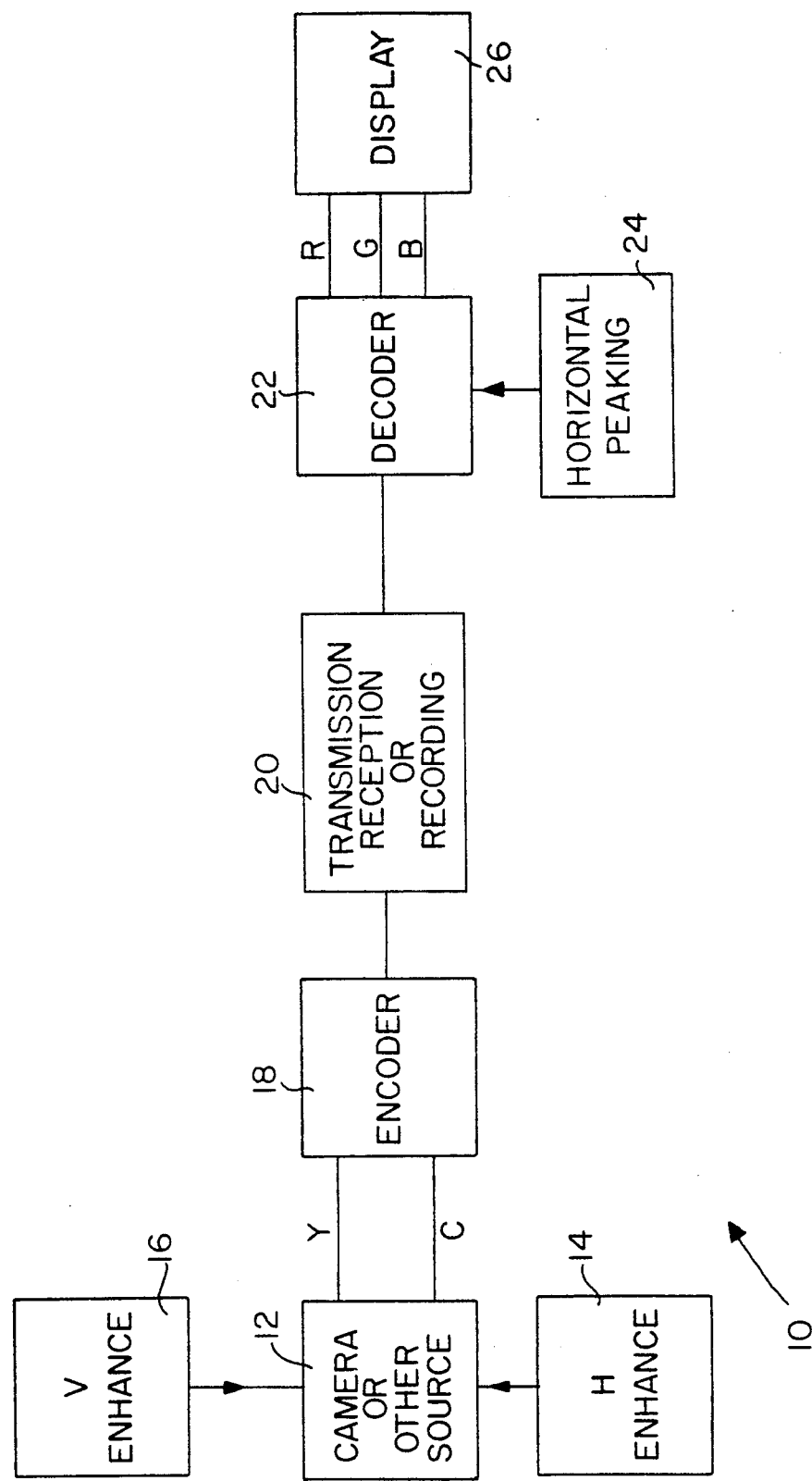
FIG. 1 is a simplified block diagram of a conventional television image orientation and display system using conventional horizontal and vertical enhancement processes at the source of the video image information.
Figure 3A:
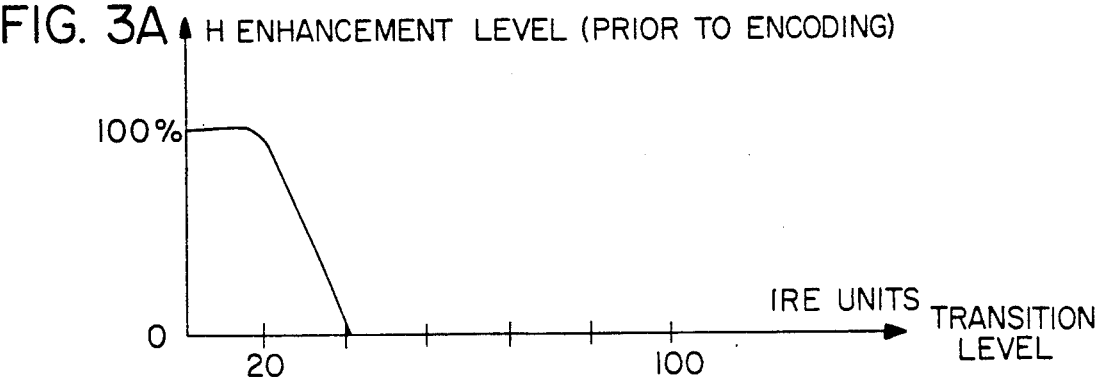
FIGS. 3A, 3B, 3C and 3D comprise graphs of enhancement levels at various locations in the FIG. 2 system.

The characteristic for the horizontal detail processor 34 is graphed as FIG. 3A. Therein, it is seen that enhancement of transitions of amplitudes zero through about 20 IRE units are provided with full (100%) enhancement. The enhancement level drops off approximately linearly from about 20 IRE units to about 40 IRE units of signal transition amplitude. If the horizontal transition amplitude is in excess of about 40 IRE units, there is no horizontal detail processing at the processor 34.

The detail enhanced luminance put out by the processor 34 is combined with the chroma information from the source 32 in an encoder 36, which may be a conventional NTSC encoder. The output of the encoder 36 leads to a degrading medium 38, whether RF modulation/broadcast or tape recording, for example. At the reception end, a decoder 40 reverses the encoding process and puts out e.g. red, green and blue signal components on lines R, G and B to a line doubler 42. The line doubler 42 may be of the type described in the commonly owned U.S. patent application Ser. No. 07/334,004, filed on Apr. 5, 1989, and entitled "Television Scan Line Doubler Including Temporal Median Filter", the disclosure of which is hereby incorporated herein by reference thereto. Scan line doubled red, green and blue signal components are put out by the line doubler 42 to an image processor 44.

Figure 3B:
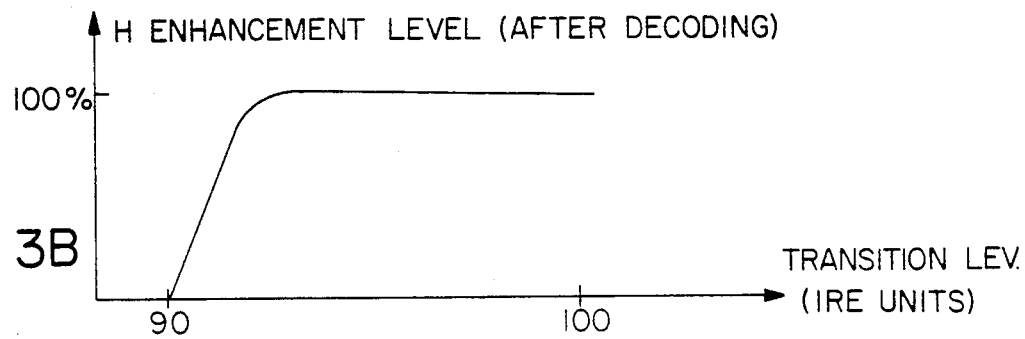
Figure 3C:
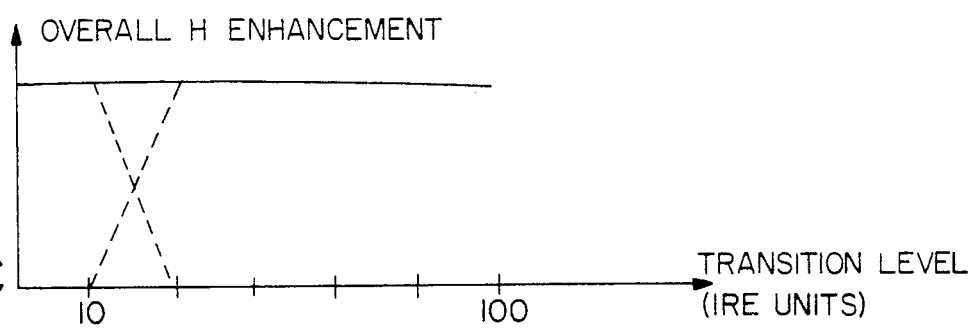

Cooperating within the image processor 44 is a horizontal domain enhancement processor 46 which provides for horizontal domain enhancement of large level image transitions, i.e. transitions beginning at 20 IRE units and increasing approximately linearly up to about 40 IRE units wherein the enhancement process works at 100%. This characteristic of the horizontal domain enhancement processor 46 is graphed as FIG. 3B. When the pre-encoding low level detail enhancement process added by the processor 34 is combined with the post-decoding large transition enhancement process added by the processor 46, the overall horizontal domain enhancement process is provided evenly at 100%, as graphed by FIG. 3C.

Figure 3D:
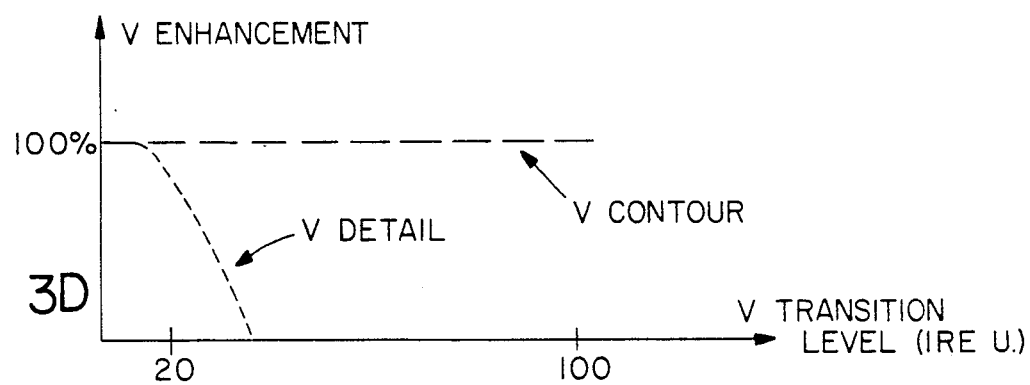

Also cooperating within the image processor is a vertical domain enhancement processor 48. The processor 48 advantageously provides a combination of conventional vertical contour or aperture correction techniques 49, such as described in U.S. Pat. No. 3,536,826, for example, the disclosure thereof being incorporated herein by reference, and low level detail boost 51 as taught by the referenced prior U.S. Pat. No. 4,262,304. The enhancement characteristics, both for contour and for detail, are shown in FIG. 3D.

Figure 4A:
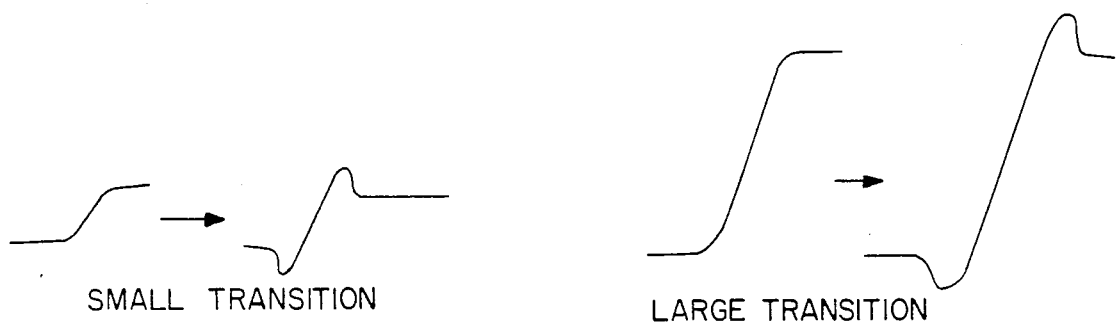
FIGS. 4A and 4B comprise comparative graphs of prior art and FIG. 2 system horizontal enhancement for small signal transitions and for large signal transitions.
Figure 4B:
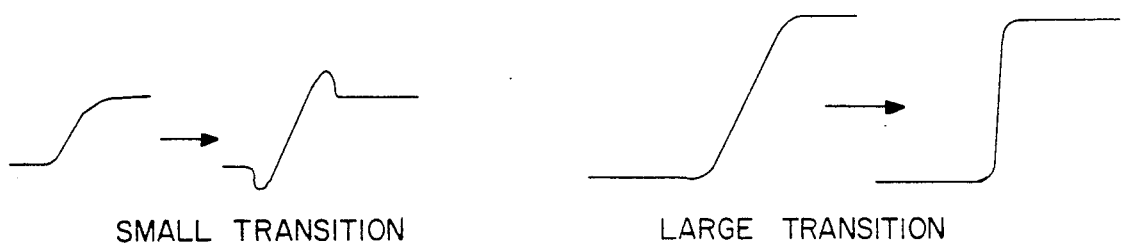
Figure 5A:
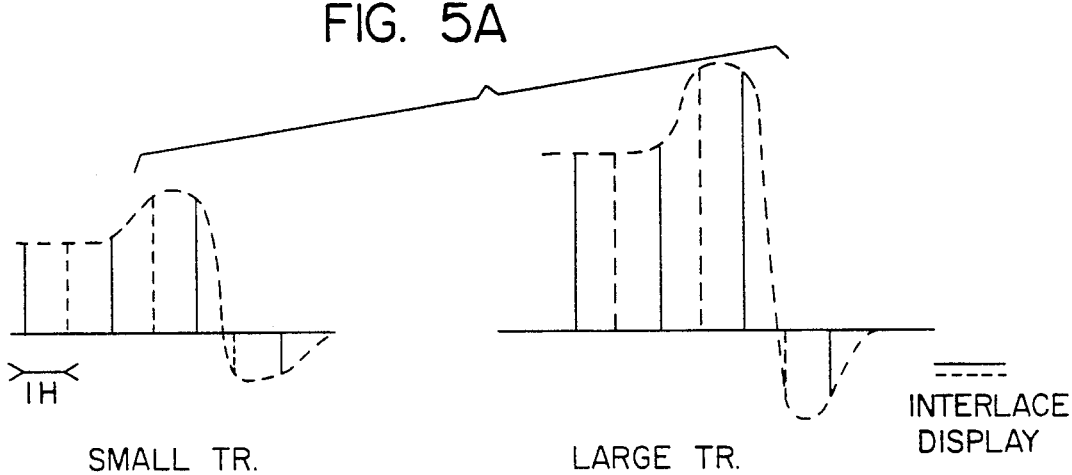
FIGS. 5A and 5B comprise comparative graphs of prior art and FIG. 2 system vertical enhancement for small signal transitions and for large signal transitions.
Figure 5B:
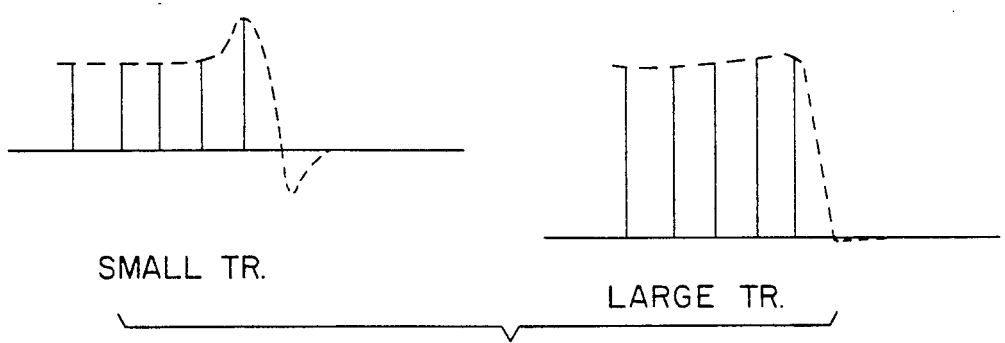

The resultant red, green and blue signals put out from the image processor 44 manifest the horizontal transition characteristics depicted in FIG. 4B for both small amplitude and large amplitude horizontal transitions. The red, green and blue signals put out from the processor 44 also manifest the vertical transition characteristics depicted in FIG. 5B for both small amplitude and large amplitude vertical transitions.

From the foregoing discussion, the following conclusions are immediately apparent:

For horizontal enhancement, small horizontal transitions enhancement is performed in the luminance path prior to encoding, and large horizontal transitions enhancement is performed either in the luminance path or in the red, green and blue paths, but always after decoding, before or after line doubling. The FIG. 2 implementation calling for large horizontal transitions enhancement after line doubling is preferred, as it makes frequency response requirements of the line doubler less stringent. The use of multiplicative enhancement techniques (as taught by the referenced U.S. Pat. No. 4,030,121, for example) for large horizontal transitions is preferred, as no ringing or overshoot will be visible. A high enhancement threshold for the process after the decoder is desirable as small amplitude horizontal transitions have already been enhanced prior to encoding. This arrangement of tandem processes advantageously significantly reduces or eliminates any effect of transmission/recording path noise on the enhanced picture image thereby yielding an improved visual signal to noise ratio.

The use of the described cooperative horizontal enhancement processes renders the television signal far less sensitive to noise from the degrading path, whether broadcast or recording. Small horizontal transitions rise times are reduced without increasing the bandwidth requirements of the signal degrading path. Preshoot and overshoot are not visible, as they are proportional to the transition level and as only small transition levels are enhanced. Large horizontal transitions rise times are reduced without preshoot and overshoot (multiplicative enhancement of the type described in U.S. Pat. No. 4,030,121, for example) and without noise increase (by virtue of the high 20-40 IRE unit threshold).

Vertical enhancement is performed after line doubling, since the samples (scanning lines) are twice closer than anywhere else in the overall system process path. As a result the vertical enhancement will appear to be twice finer than before (i.e. the vertical transition appears to be twice shorter as scanning lines are twice closer to each other), and virtual vertical resolution will be increased. A combination of conventional vertical contour/aperture correction techniques as taught by the referenced U.S. Pat. No. 3,536,826 and used in moderation, and low level vertical detail boost as taught by referenced U.S. Pat. Nos. 4,262,304 and 4,847,681, provides an optimized vertical enhancement process.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for providing cooperative horizontal enhancements and a vertical enhancement to a television video image signal passing through a system including a video source, a degrading path such as transmission or recording, and a display, without using a pilot tone, the apparatus including:

horizontal domain low transition level detail processor means connected between the video source and the degrading path for enhancing horizontal transitions below about 40 IRE units in accordance with a predetermined low level detail enhancement curve prior to passage of the signal through the degrading path, line doubler means between the degrading path and an image processor means for doubling the number of scan lines within the signal, the image processor means for processing the doubled number of scan lines and for delivering said processed lines to the display, horizontal domain large transition level enhancement processor means connected to the image processor means for enhancement horizontal transitions above about 20 IRE units following passage of the signal through the degrading path in accordance with a predetermined large level enhancement curve which is substantially complementary to the enhancement curve followed by the horizontal domain low transition level detail processor means so that a resultant overall horizontal domain signal enhancement is substantially constant for all horizontal domain signal levels, and vertical domain transition enhancement processor means connected to the image processor means for performing at least one of vertical domain aperture correction and low level boost enhancement upon the doubled scan lines.

2. The apparatus set forth in claim 1 wherein the vertical domain transition enhancement processor means comprises a combination of means for contour processing and for low level detail processing.

3. A television signal processing system comprising:

a source of video images for providing luminance and chrominance components of the video images by generating and putting out scan lines, horizontal domain detail processor means connected for boosting horizontal transitions of the luminance component put out by the source below a predetermined threshold level in accordance with a predetermined low level horizontal transition boost curve, encoder means connected to encode the chrominance component and the detail boosted luminance component into an encoded signal in accordance with a predetermined signal format, degrading path means of the type such as transmission and recording through which the encoded signal is passed, decoder means connected to receive the encoded signal passed through the degrading path and to decode the signal in accordance with the predetermined signal format to produce luminance and chrominance components, line doubler means connected to the decoder means for doubling the number of decoded scan lines of the signal and for putting out scan line doubled luminance and chrominance components, image processor means connected to the line doubler means and including horizontal domain transition high level enhancement processor means for enhancing horizontal domain transitions having an amplitude above the predetermined threshold level in accordance with a high level transition boost curve which is substantially complementary with the said low level transition boost curve so that a resultant overall horizontal domain signal enhancement is substantially constant for all horizontal domain signal levels, and the image processor means further including vertical enhancement processor means for enhancing vertical domain transitions in accordance with at least one of vertical domain aperture correction and low level signal boost enhancement.

4. The television signal processing system set forth in claim 3 wherein the predetermined threshold lies in a range between about 20 IRE units and about 40 IRE units.

5. The television signal processing system set forth in claim 3 wherein the predetermined vertical domain enhancement criteria comprise a combination of low level detail boost and aperture correction.

* * * * *